US010270312B1

(12) United States Patent
Kong

(10) Patent No.: US 10,270,312 B1
(45) Date of Patent: Apr. 23, 2019

(54) POWER GENERATION DEVICE, POWER GENERATION ASSEMBLY AND METHOD OF GENERATION OF POWER

(71) Applicant: HITNOLOGY CO. LTD, Beijing (CN)

(72) Inventor: Sui Kong, Beijing (CN)

(73) Assignee: HITNOLOGY CO. LTD. (CN)

( * ) Notice: Subject to any disclaimer, the term of this patent is extended or adjusted under 35 U.S.C. 154(b) by 0 days.

(21) Appl. No.: 16/038,944

(22) Filed: Jul. 18, 2018

(30) Foreign Application Priority Data

May 3, 2018 (CN) .......................... 2018 1 0414490

(51) Int. Cl.

| | |
|---|---|
| ***H02K 7/06*** | (2006.01) |
| ***H02K 99/00*** | (2014.01) |
| ***H02K 7/116*** | (2006.01) |
| ***H02K 7/02*** | (2006.01) |
| *H02N 2/18* | (2006.01) |

(52) U.S. Cl.

CPC ................. *H02K 7/06* (2013.01); *H02K 7/02* (2013.01); *H02K 7/116* (2013.01); *H02K 99/10* (2016.11); *H02N 2/18* (2013.01)

(58) Field of Classification Search

CPC ........... F03G 7/08; F16H 25/04; H02K 35/00; H02K 7/06; H02K 35/02; H02K 35/04; H02K 7/1853; H02K 99/10; H02N 2/18

USPC ............ 310/80; 290/1 R, 53; 322/3; 74/410; 404/71

See application file for complete search history.

(56) References Cited

U.S. PATENT DOCUMENTS

| | | | | |
|---|---|---|---|---|
| 4,282,442 A * | 8/1981 | Massinger | F16H 25/122 | 290/1 C |
| 4,614,875 A * | 9/1986 | McGee | H02K 7/1853 | 290/1 C |
| 4,912,995 A * | 4/1990 | Otters | F02G 1/043 | 290/1 C |
| 6,949,840 B2 * | 9/2005 | Ricketts | F03G 7/08 | 290/1 A |
| 7,429,145 B2 * | 9/2008 | Rastegar | B64F 1/02 | 290/1 R |
| 7,432,607 B2 * | 10/2008 | Kim | F03G 7/08 | 290/1 R |
| 8,754,558 B2 * | 6/2014 | Casas | H02K 7/06 | 290/53 |

* cited by examiner

*Primary Examiner* — Burton S Mullins

(74) *Attorney, Agent, or Firm* — Calfee, Halter & Griswold LLP

(57) ABSTRACT

The present invention discloses a power generation device, a power generation assembly and a method of generation of power. The power generation device includes a housing; a leadscrew, a first end of the leadscrew is connected to the top of the housing, and a second end of the leadscrew extends toward the bottom of the housing; a magnetic stator and a magnetic rotor, the magnetic stator is arranged at the bottom of the housing, and the magnetic rotor is mounted at the second end of the leadscrew; a shaft sleeve, a threaded hole is provided on the shaft sleeve, and the leadscrew is in screw joint within the threaded hole; a connecting shaft and a pressing plate.

9 Claims, 3 Drawing Sheets

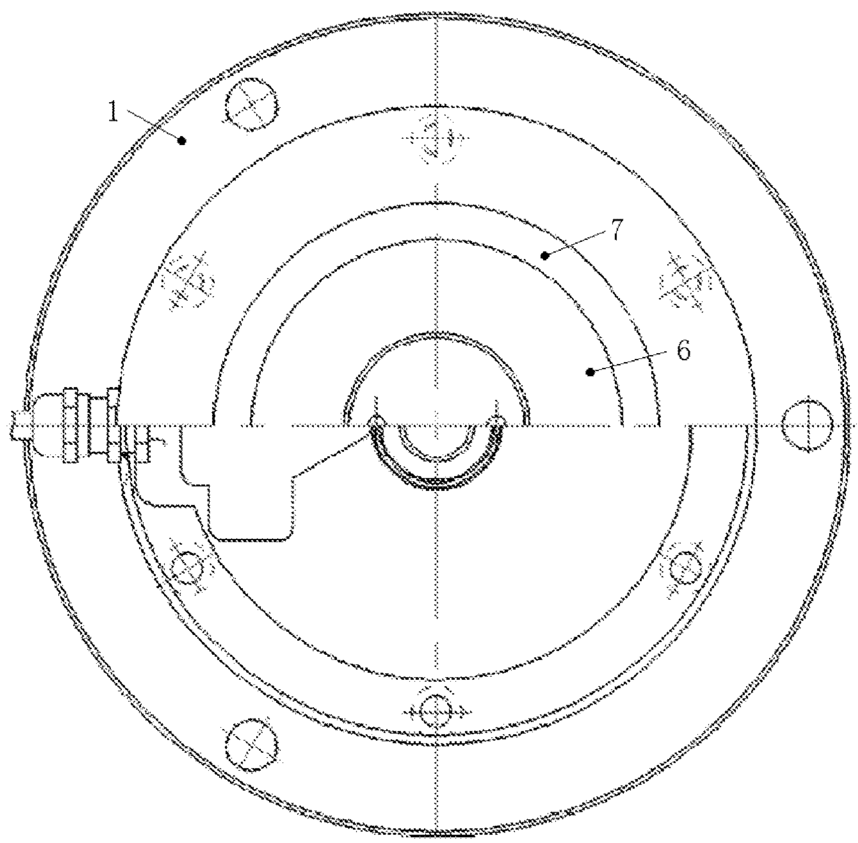

FIG. 4 mounting the power generation assembly under the ground, and locating the floor on the ground; S1

↓ applying an acting force directed toward the bottom of the housing to the floor and driving the pressing plate to move the connecting shaft toward the housing , such that the shaft sleeve moves along the axial direction of the leadscrew toward the bottom of the housing under the pressure of the connecting shaft; S2

↓ rotating the leadscrew with the action of the shaft sleeve , and the leadscrew being rotated to drive the magnetor rotor to cut the magnetic induction lines generated by the magnetor stator which produces current to generate power. S3

FIG. 5

POWER GENERATION DEVICE, POWER GENERATION ASSEMBLY AND METHOD OF GENERATION OF POWER

CROSS-REFERENCE TO RELATED APPLICATIONS

The present application claims priority to Chinese Patent Application No. 201810414490.8, filed on May 3, 2018, and the entire contents thereof are incorporated herein by reference.

TECHNICAL FIELD

The present invention relates to the field of power generation technique, especially a power generation device, a power generation assembly and a method of generation of power.

BACKGROUND ART

Electric energy is the energy which is massively used in the life and production. At present, a large portion of electric energy is still generated through fire coal. With the declining of mineral energy on earth and deteriorating of the environment, how to generate power in energy conservation and emission reduction way has become the major issue in the energy studies in the world today.

In the prior art, the study on power generation using road has aroused more and more attention. The main way for power generation through road is to generate power through the power-generating floor, by mounting the power-generating floor on the surface of the road. A generator is provided on the power-generating floor. A pedestrian exerts pressure to the power-generating floor while stepping over the power-generating floor, and the engaged rack and gear on the generator plate will move under the pressure and mechanically store the energy. The generator converts the mechanical energy into electrical energy to generate power. The inventor, during the process of realizing the invention-creation, found that there were the following disadvantages by mounting a photovoltaic electrical plate on road to generate power. Firstly, the mechanical structure on the power-generating floor is relatively complex, and it consumes a lot of mechanical energy during the mechanical movement process, but has low generating efficiency and poor structural stability. Secondly, the kinetic energy produced by pressure needs to be converted into mechanical energy through the movement of the gear and rack, and then the mechanical energy can be converted into electric energy to drive the generator to start, as a result, the kinetic energy collected by the power-generating floor cannot be directly and quickly converted into electric energy, and thus the utilization of kinetics is low, thereby resulting in poor electric energy production and practicality of the power-generating floor.

Therefore, it is necessary to solve the above technical problem.

SUMMARY

The present invention provides a power generation device, a power generation assembly and a method of generation of power to solve the problems existing in the prior art, increase the generating efficiency and generating capacity, reduce the mechanical energy consumption during the generating process, realize large-scale electricity generation, increase the practicality, reduce the conversion steps from pressure to electric energy, and increase the stability and reliability.

The present invention provides a power generation device comprising a housing; a leadscrew, a first end of the leadscrew being rotatably connected to the top of the housing, and a second end of the leadscrew extending toward the bottom of the housing; a magnetic stator and a magnetic rotor arranged outside of the magnetic stator, the magnetic stator being arranged at the bottom of the housing, and the magnetic rotor being mounted at the second end of the leadscrew; a shaft sleeve, on which a threaded hole is provided, the leadscrew being in screw joint within the threaded hole; a connecting shaft and a pressing plate, the pressing plate being located outside of the housing and above the housing, a first end of the connecting shaft being connected with the pressing plate, and a second end of the connecting shaft extending into the inside of the housing and being fixedly connected with the shaft sleeve.

Optionally, the power generation device further comprises an elastic element, a first end of the elastic element is connected to the pressing plate, and a second end of the elastic element is connected to the top of the housing.

Optionally, the power generation device further comprises a unilateral bearing through which the magnetic rotor is mounted to the leadscrew.

Optionally, the first end of the leadscrew is rotatably mounted to the top of the housing through a first bearing, and the second end of the leadscrew is rotatably mounted to the bottom of the housing through a second bearing.

Optionally, the housing comprises a top cap and a base which are butted to each other, the first end of the leadscrew is in rotary connection with the top cap, and the second end of the leadscrew is in rotary connection with the base.

Optionally, the power generation device further comprises a fixed plate provided within the housing, and the connecting shaft is connected to the shaft sleeve through the fixed plate.

Optionally, the power generation device further comprises a flywheel, on which a connecting hole and a locating hole which are communicated are provided in the direction perpendicular to an end face of the flywheel, the connecting hole is sleeved on the second end of the leadscrew, and the magnetic rotor is mounted within the locating hole.

Optionally, the magnetic rotor comprises a plurality of pieces of strong magnets which are circumferentially distributed along the locating hole.

Based on the same inventive concept, the present invention further provides a power generation assembly comprising a floor and the power generation device mentioned above. The floor is connected with and arranged opposite to the pressing plate.

Based on the same inventive concept, the present invention further provides a method of generation of power, which generates power according to the above power generation assembly and comprises the following steps: mounting the power generation assembly under the ground, and locating the floor on the ground; applying an acting force directed toward the bottom of the housing to the floor and driving the pressing plate to move the connecting shaft toward to the housing, such that the shaft sleeve moves along the axial direction of the leadscrew toward the bottom of the housing under the pressure of the connecting shaft; rotating the leadscrew with the action of the shaft sleeve, and the leadscrew being rotated to drive the magnetic rotor to cut magnetic induction lines generated by the magnetic stator which produces current to generate power.

With the power generation device, the power generation assembly and the method of generation of power provided by the present invention, while the pedestrian or vehicle passing through the floor, the floor pushes down; while the pressing plate moves toward the housing, the connecting shaft drives the shaft sleeve to push down, the pushing of the shaft sleeve drives the leadscrew to rotate, and thus the magnetic rotor on the leadscrew cuts the magnetic induction lines generated by the magnetic stator to generate power. It is a highly simple and stable structure, which increases the reliability of the power generation. During the above power generation process, the mechanical energy directly drives the leadscrew to rotate and cut the magnetic induction lines, and the kinetic energy received by the leadscrew can be directly and quickly converted into electric energy, and there is little mechanical energy consumption. Therefore, it increases the conversion efficiency between the mechanical energy and kinetic energy and between the kinetic energy and electric energy, and increases the generating capacity and practicability.

BRIEF DESCRIPTION OF THE DRAWINGS

The preferred embodiments in the present invention are described in detail in reference to the drawings to help understand the purpose and advantages of the present invention, wherein:

FIG. 4 is a half section view of the power generation device provided by the preferred embodiment of the present invention.

FIG. 5 is a flow chart of the method of generation of power provided by the preferred embodiment of the present invention.

DETAILED DESCRIPTION

The orientation terms which are or may be mentioned in the present description, such as above, below, left, right, front, behind, front side, rear side, top, bottom, and so on, are defined relative to the construction shown in each figure, and the words "inner" and "outer" are opposite concepts, which respectively mean the direction towards or away from the geometrical center of the particular element, and thus they may be correspondingly changed according to different positions where they exist and different states of use. Therefore, these or other orientation terms should not be explained as restriction terms.

Figure 1:
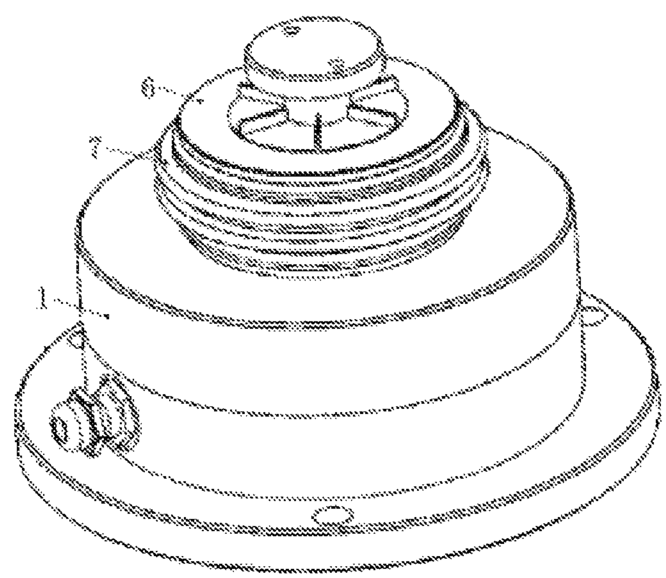
FIG. 1 is a schematic diagram of the structure of the power generation device provided by the preferred embodiment of the present invention.
Figure 2:
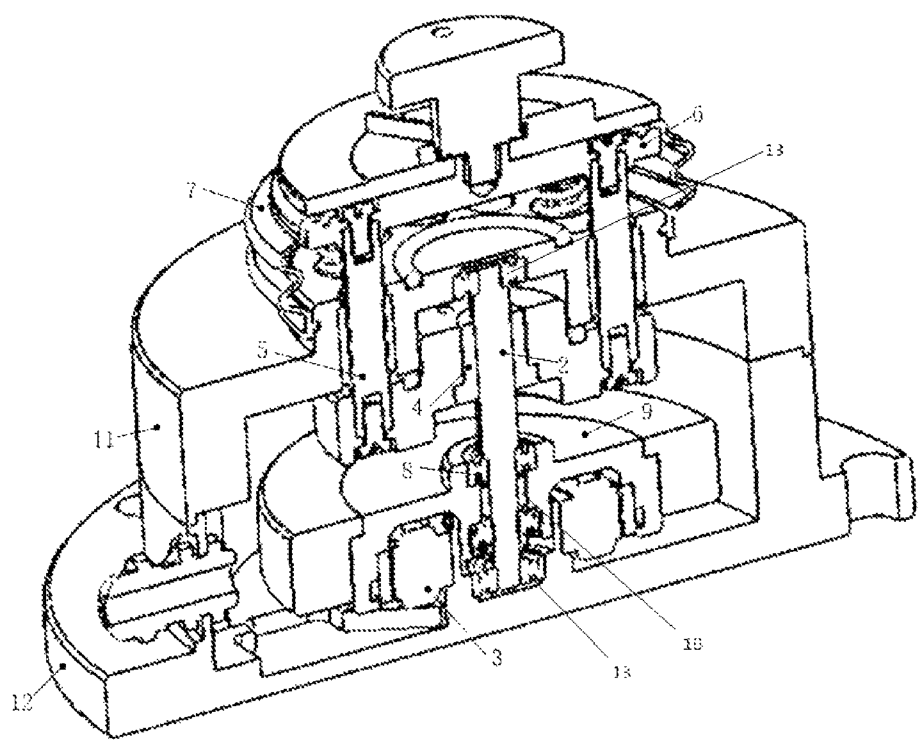
FIG. 2 is a section view of the power generation device provided by the preferred embodiment of the present invention.
Figure 3:
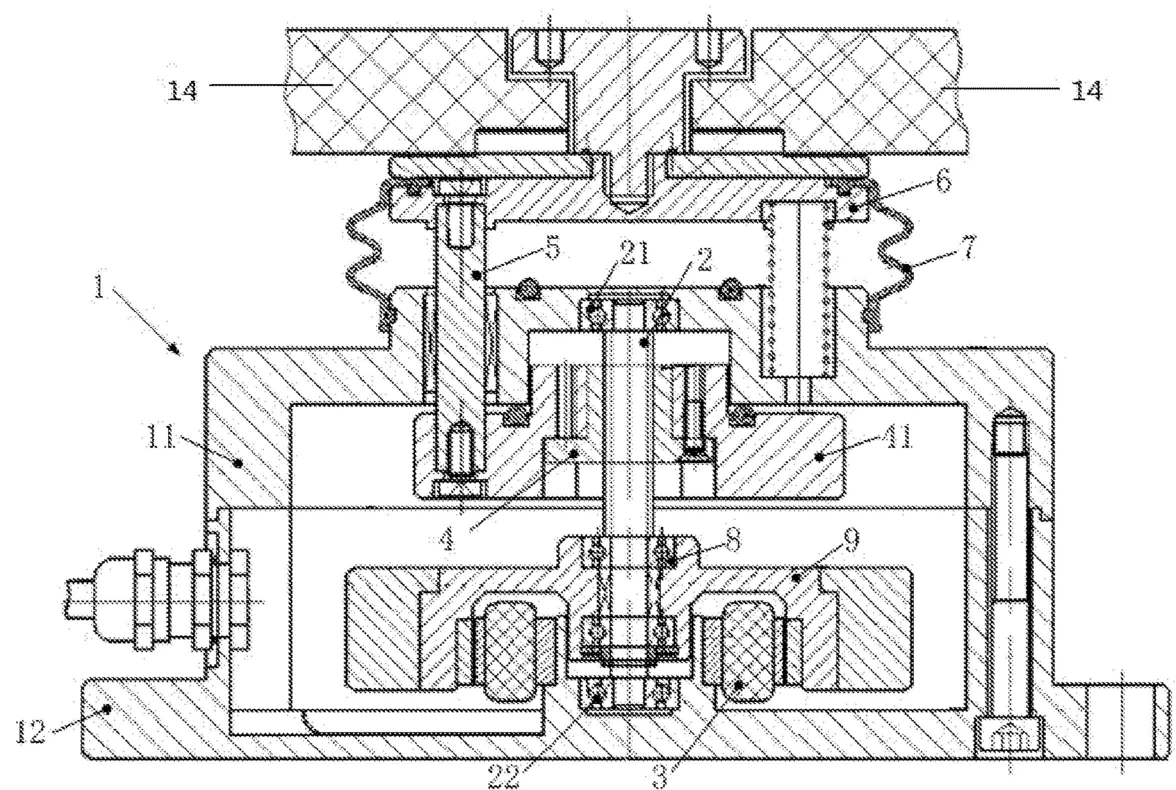
FIG. 3 is a cross-section view of the power generation device provided by the preferred embodiment of the present invention.

FIG. 1 is the schematic diagram of the structure of the power generation device provided by the preferred embodiment of the present invention. FIG. 2 is the section view of the power generation device provided by the preferred embodiment of the present invention. FIG. 3 is the cross-section view of the power generation device provided by the preferred embodiment of the present invention. FIG. 4 is the half section view of the power generation device provided by the preferred embodiment of the present invention. As shown in FIGS. 1-4, the power generation device provided by the present invention comprises a housing 1, a leadscrew 2, a magnetic stator 3, a magnetic rotor (not shown) arranged outside of the magnetic stator 3, a shaft sleeve 4, a connecting shaft 5 and a pressing plate 6.

Referring to FIGS. 1-4 at the same time, the housing 1 supports and protects the leadscrew 2, the first end of the leadscrew 2 is in rotary connection with the top of the housing 1, and the second end of the leadscrew 2 extends toward the bottom of the housing 1; the magnetic stator 3 is arranged at the bottom of the housing 1 and maintains still. The magnetic rotor is mounted to the second end of the leadscrew 2; the shaft sleeve 4 is provided with a threaded hole, and the leadscrew 2 is in screw joint within the threaded hole; the pressing plate 6 is located outside of the housing 1 and above the housing 1, the first end of the connecting shaft 5 is connected with the pressing plate 6, and the second end of the connecting shaft 5 extends into the inside of the housing 1 and is fixedly connected with the shaft sleeve 4. The above structure is highly simple and stable, and thus increases the reliability for power generation. Wherein, the shaft sleeve 4 may be a leadscrew nut, the internal thread of which is highly engaged with the external thread of the leadscrew 2. When the leadscrew nut moves up and down along the leadscrew 2 ("moves up and down" herein refers to moving in the up and down direction in FIG. 3), the leadscrew 2 may quickly and synchronously rotate, which increases the efficiency for converting the vertical movement of the shaft sleeve 4 into the horizontal rotation of the leadscrew 2. Moreover, both the leadscrew 2 and the connecting shaft 5, the master pieces of the present invention for the mechanical movement, adopt rolling friction, which has the advantages of low resistance, noise, consumption, and failure rate and high efficiency.

As an embodiment of power generation, when an acting force toward the housing 1 is applied to the pressing plate 6, the pressing plate 6 drives the connecting shaft 5 to move toward the housing 1, and then the shaft sleeve 4 slides down along the leadscrew 2 toward the housing 1, the leadscrew 2 starts to rotate through being driven by the shaft sleeve 4 to drive the magnetic rotor to rotate and cut magnetic induction lines generated by the magnetic stator 3, and thus a magnetic rotor and magnetic stator generate current to generate power. During the above power generation process, the mechanical energy directly drives the leadscrew 2 to rotate and cut the magnetic induction lines, and the kinetic energy received by the leadscrew 2 can be directly and quickly converted into electric energy, and there is little mechanical energy consumption. Therefore, it increases the conversion efficiency between the mechanical energy and kinetic energy and between the kinetic energy and electric energy, and increases the generating capacity and practicability.

In the power generation device provided by the embodiment of the present invention, when the pressing plate 6 moves toward the housing 1, the connecting shaft 5 drives the shaft sleeve 4 to push down, the pushing of the shaft sleeve 4 drives the leadscrew 2 to rotate, and thus the magnetic rotor on the leadscrew 2 cuts the magnetic induction lines generated by the magnetic stator 3 to generate power. It is a highly simple, stable and reliable structure, which increases the reliability of the power generation. During the above power generation process, the mechanical energy directly drives the leadscrew 2 to rotate and cut the magnetic induction lines, and the kinetic energy received by the leadscrew 2 can be directly and quickly converted into electric energy. It overcomes the delay caused by multiple mechanical conventions, and there is little mechanical energy consumption. Therefore, it increases the conversion efficiency between the mechanical energy and kinetic energy and between the kinetic energy and electric energy, and increases the generating capacity and practicability.

Optionally, the power generation device further comprises an elastic element 7, wherein the first end of the elastic element 7 is connected to the pressing plate 6, and the second end of the elastic element 7 is connected to the top of the housing 1. When the pressing plate 6 is compressed under pressure in the direction toward the housing 1, the elastic element 7 suffers from the compression and deformation; when the pressure is relieved, the elastic element 7 drives the pressing plate 6 to move in the direction away from the housing 1, so as to restore the position of the pressing plate 6 and prepare for the next downward movement. The elastic element 7 herein may be a spring, which may generate a reacting force after being compressed to effectively rebound the pressing plate 6 back.

As an optional implementation process, the power generation device further comprises a unilateral bearing 8 through which the magnetic rotor is mounted to the leadscrew 2. When the pressing plate 6 moves toward the bottom of the housing 1, the leadscrew 2 rotates in forward direction under the effect of the shaft sleeve 4, and the magnetic rotor rotates in forward direction along the leadscrew 2 through being driven by the unilateral bearing 8; when the pressing plate 6 moves away from the housing 1, the leadscrew 2 rotates in backward direction, by this time the magnetic rotor departs from the leadscrew 2 under the control of the unilateral bearing 8 and may continue to rotate in forward direction and cut the magnetic induction lines in the role of inertia. The megnetor continues the power generation output, which increases the duration and generating capacity for power generation.

Furthermore, the first end of the leadscrew 2 is rotatably mounted to the top of the housing 1 through the first bearing 21, and the second end of the leadscrew 2 is rotatably mounted to the bottom of the housing 1 through the second bearing 22, which reduce the frictional loss between the first end and the second end of the leadscrew 2 and the housing 1 during the rotation process and further increase the efficiency for converting mechanical energy into electric energy.

Preferably, the housing 1 comprises a top cap 11 and a base 12 which are butted to each other, wherein the first end of the leadscrew 2 is in rotary connection with the top cap 11, and the second end of the leadscrew 2 is in rotary connection with the base 12. The above configuration makes it easy for installation steps of the leadscrew 2 within the housing 1, the connecting shaft 5 and the pressing plate 6, thereby saving the assembling time.

Optionally, the power generation device further comprises a fixed plate 41 provided within the housing 1, through which the connecting shaft 5 is connected to the shaft sleeve 4. The leadscrew nut is mounted on the fixed plate 41 which provides stress support for the leadscrew nut. Furthermore, the leadscrew nut is mounted on the fixed plate 41, which is connected to the pressing plate 6 through six connecting shafts 5 circumferentially and evenly distributed along the fixed plate 41, so as to increase the stability of the connection between the fixed plate 41 and the pressing plate 6. Even further, the housing 1 is also provided with a linear bearing. All the six connecting shafts 5 pass through the linear bearing which plays a guiding role for the connecting shafts 5, thereby further increasing the stability and reliability of the structure.

On the basis of the above embodiments, the power generation device further comprises a flywheel 9, on which a connecting hole 10 and a locating hole 13 which are communicated are provided in the direction perpendicular to the end face of the flywheel 9, wherein the connecting hole 10 is sleeved on the second end of the leadscrew 2, and the magnetic rotor is mounted within the locating hole 13. The flywheel 9 is connected to the leadscrew 2 through the unilateral bearing 8. The flywheel 9 may rotate in forward direction with the leadscrew 2, and when the leadscrew 2 rotates in backward direction, the flywheel 9 departs from the leadscrew 2 under the control of the unilateral bearing 8 and may continue to rotate in forward direction in the role of inertia. The flywheel 9 may store the redundant kinetic energy while the leadscrew 2 rotates in forward direction. When the leadscrew 2 rotates in backward direction or stops, the flywheel 9 may continue to rotate in the role of inertia and release the stored kinetic energy, so as to enable the megnetor rotor to continue to cut the magnetic induction lines. The flywheel 9 and the megnetor rotor are integrated. With the aid of the kinetic energy and inertia of the flywheel 9 in the state of high-speed revolution, the mechanical energy may be effectively stored, so as to enable the efficient use of the mechanical energy. Moreover, the impulse obtained by the flywheel 9 is increased, and the output power of power generation is further increased.

Furthermore, the magnetic rotor comprises a plurality of pieces of strong magnets which are circumferentially distributed along the locating hole 13. The plurality of pieces of strong magnets may increase the intensity of the magnetic rotor to cut the magnetic induction lines. The flywheel 9 rotates and drives the plurality of pieces of strong magnets to rotate. The faster the speed, the higher the output voltage.

There is also a locating hole 13 in the top of the housing 1. The locating hole 13 in the housing 1 is used for the first end of the leadscrew 2.

Based on the same inventive concept, the present invention further provides a power generation assembly comprising a floor 14 and any one of the above power generation devices, wherein the floor 14 is connected with and arranged opposite to the pressing plate 6. When the pedestrian or vehicle passes through the floor 14, a pressure is applied on the floor 14. The floor 14 pushes down and converts the suffered pressure into electric energy through the power generation device, which is environmental protection and energy-saving and cost-reducing. Furthermore, the floor 14 adopts the honeycomb structure of light composite floor 14 in the form of an equilateral triangle with the side length of 600 mm, which has a light weight and high intensity. Each piece of floor 14 is connected to the three power generation units whose total output is over 30W.

It should be noted that the present invention adopts the mechanical standard elements, such as the common leadscrew 2, bearing, and so on, which reduces the manufacturing difficulty and greatly reduces the production cost.

In addition, the present invention adopts the dual patterns of mechanical energy storage and electric energy storage; the mechanical energy storage adopts the pattern of the flywheel 9 and the flywheel 9 is integrated with the magnetic rotor. The electric energy storage adopts the capacitor, wherein the lithium battery is connected to the magnetic stator 3 to charge and store energy, which solves the problem of insufficient use of mechanical energy existing in the existing power-generating floor 14; and the capacitor storage solves the problem of electric energy waste caused by failure of the charge of the lithium battery due to low voltage during the beginning and ending phase of the pedestrian passing through the floor 14 each time.

As to the power generation assembly provided by the embodiments of the present invention, while the pedestrian or vehicle passing through the floor 14, the floor 14 pushes down; when the pressing plate 6 moves toward the housing 1, the connecting shaft 5 drives the shaft sleeve 4 to push down. The pushing of the shaft sleeve 4 drives the leadscrew 2 to rotate, and then the magnetic rotor on the leadscrew 2 cuts the magnetic induction lines generated by the magnetic stator 3 to generate power. The structure is highly simple and stable, which increases the reliability for power generation. During the above power generation process, the mechanical energy directly drives the leadscrew 2 to rotate and cut the magnetic induction lines, and the kinetic energy received by the leadscrew 2 can be directly and quickly converted into electric energy, and there is little mechanical energy consumption. Therefore, it increases the conversion efficiency between the mechanical energy and kinetic energy and between the kinetic energy and electric energy, and increases the generating capacity and practicability.

FIG. 5 is the flow chart of the method of generation of power provided by the preferred embodiment of the present invention.

Referring to FIGS. 1-5 at the same time, based on the same inventive concept, the present invention further provides a method of generation of power, which generates power according to the power generation assembly and comprises the following steps: S1: mounting the power generation assembly under the ground, and locating the floor 14 on the ground; S2: applying an acting force directed toward the bottom of the housing 1 to the floor 14 and driving the pressing plate 6 to move the connecting shaft 5 toward the housing 1, such that the shaft sleeve 4 moves along the axial direction of the leadscrew 2 toward the bottom of the housing 1 under the pressure of the connecting shaft 5; S3: rotating the leadscrew 2 with the action of the shaft sleeve 4, and the leadscrew 2 being rotated to drive the magnetic rotor to cut the magnetic induction lines generated by the magnetic stator 3 which produces current to generate power.

The embodiments of the present invention provide the power generation device, power generation assembly and method of generation of power. While the pedestrian or vehicle passing through the floor 14, the floor 14 pushes down; when the pressing plate 6 moves toward the housing 1, the connecting shaft 5 drives the shaft sleeve 4 to push down. The pushing of the shaft sleeve 4 drives the leadscrew 2 to rotate, and then the magnetic rotor on the leadscrew 2 cuts the magnetic induction lines generated by the magnetic stator 3 to generate power. The structure is highly simple and stable, which increases the reliability for power generation. During the above generation process, the mechanical energy directly drives the leadscrew 2 to rotate and cut the magnetic induction lines, and the kinetic energy received by the leadscrew 2 can be directly and quickly converted into electric energy, and there is little mechanical energy consumption. Therefore, it increases the conversion efficiency between the mechanical energy and kinetic energy and between the kinetic energy and electric energy, and increases the generating capacity and practicability.

Finally, it should be noted that the above embodiments are merely used to explain the technical solution of the present invention, rather than to limit the technical solution; although the present invention is explained in detail according to the preceding embodiments, those skilled in the art should understand that: they can also amend the technical solution recorded in each embodiment as above-mentioned, or make equivalent substitutions to part of the technical features therein; however, these amendments or substitutions should not make the essence of the corresponding technical solution depart from the scope of the technical solution of each embodiment of the present invention.

The invention claimed is:

1. A power generation device, comprising:

a housing;

a leadscrew, a first end of the leadscrew rotatably connected to a top of the housing, and a second end of the leadscrew extending toward a bottom of the housing;

a magnetic stator, arranged at the bottom of the housing;

a magnetic rotor arranged outside of the magnetic stator, and mounted at the second end of the leadscrew;

a shaft sleeve, having a threaded hole, the leadscrew extending through the threaded hole and internal threads in the threaded hole engaging with external threads on the leadscrew;

a pressing plate, located outside of the housing and above the housing;

at least one connecting shaft, a first end of the connecting shaft being connected with the pressing plate, and a second end of the connecting shaft extending into an inside of the housing and being fixedly connected with the shaft sleeve; and a fixed plate provided within the housing, the at least one connecting shaft being connected to the shaft sleeve through the fixed plate, the shaft sleeve being centered and mounted in the fixed plate, the at least one connecting shaft being arranged along a periphery of the fixed plate.

2. The power generation device according to claim 1, further comprising an elastic element, a first end of the elastic element is connected to the pressing plate, and a second end of the elastic element is connected to a top of the housing.

3. The power generation device according to claim 1, further comprising a bearing through which the magnetic rotor is mounted to the leadscrew, and the bearing allows rotation in one direction.

4. The power generation device according to claim 1, wherein the first end of the leadscrew is rotatably mounted to a top of the housing through a first bearing, and the second end of the leadscrew is rotatably mounted to the bottom of the housing through a second bearing.

5. The power generation device according to claim 4, wherein the housing comprises a top cap and a base which are butted to each other, the first end of the leadscrew is in rotary connection with the top cap, and the second end of the leadscrew is in rotary connection with the base.

6. The power generation device according to claim 1, further comprising a flywheel, in which a connecting hole and a locating hole are provided in a direction perpendicular to an end face of the flywheel, the connecting hole is connected with the locating hole, the second end of the lead screw extends through the connecting hole, and the magnetic rotor is mounted within the locating hole.

7. The power generation device according to claim 6, wherein the magnetic rotor comprises a plurality of pieces of strong magnets which are circumferentially distributed along the locating hole.

8. A power generation assembly, comprising a floor and the power generation device of claim 1, wherein the floor is connected with the pressing plate.

9. A method of generation of power, according to the power generation assembly of claim 8 and comprising the following steps:

mounting a power generation device of the power generation assembly under a surface of ground, and locating a floor of the power generation assembly on the surface of the ground;

applying an acting force directed toward the bottom of the housing to the floor and driving the pressing plate to move at least one connecting shaft arranged along a periphery of the fixed plate toward the housing, such that the shaft sleeve centered and mounted in the fixed plate moves along an axial direction of the leadscrew toward the bottom of the housing under the pressure of the connecting shaft; and rotating the leadscrew with the action of the shaft sleeve, and the leadscrew being rotated to drive the magnetic rotor to cut magnetic induction lines generated by the magnetic stator which produces a current to generate power.

* * * * *